Sept. 22, 1970    M. L. BENJAMIN ETAL    3,529,842
QUICK RELEASE TOOL HOLDER
Filed Nov. 26, 1968
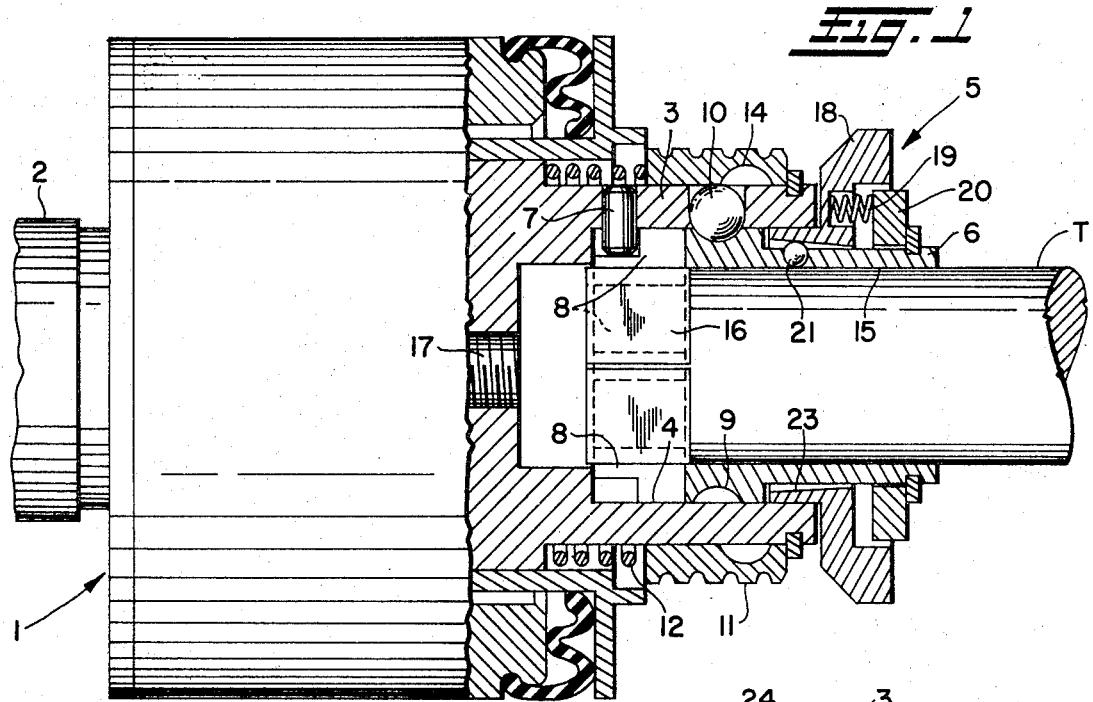
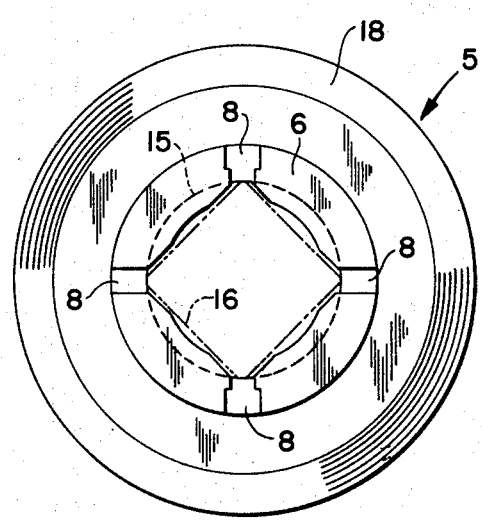
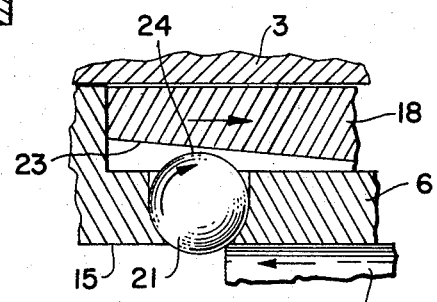
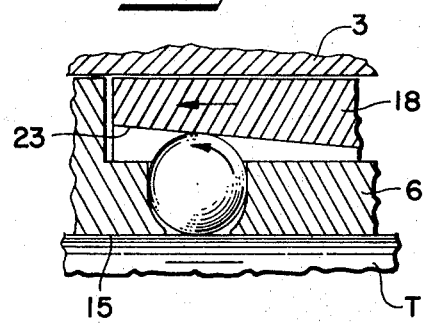
INVENTORS
MILTON L. BENJAMIN
DAVID D. WALKER
WILBUR N. MILES
BY
Oberlin, Maky, Donnelly & Renner
ATTORNEYS text …

3,529,842
QUICK RELEASE TOOL HOLDER

Milton L. Benjamin, David D. Walker, and Wilbur N. Miles, Chagrin Falls, Ohio, assignors to Erickson Tool Company, Solon, Ohio, a corporation of Ohio
Filed Nov. 26, 1968, Ser. No. 779,070
Int. Cl. B23b *31/22*
U.S. Cl. 279—30                3 Claims

ABSTRACT OF THE DISCLOSURE

A quick release tool holder which provides quick release connections between a tool supporting cartridge and a holder and between the cartridge and a tool thus to provide for quick replacement in the holder of one cartridge-tool assembly by another or for quick replacement in the cartridge of a broken or dull tool by a new or resharpened tool.

BACKGROUND OF THE INVENTION

In the case of expensive, high-speed machine tools it is desirable to keep down time to a minimum so as to maintain productive capacity at a high level. In the case of a machine tool employing a collet type chuck if a tap or like tool breaks within the collet it usually is necessary to completely disassemble the chuck in order to remove the portion of the tap remaining in the chuck and thus several minutes may elapse before machine tool operation is resumed.

SUMMARY OF THE INVENTION

Accordingly, it is a principal object of the present invention to provide a quick release tool holder wherein a tool supporting cartridge has a ball type quick disconnect coupling connection with a holder on the machine whereby, in a matter of a few seconds time, one tool supporting cartridge may be released from the holder and another one assembled in its place simply by manipulating a ball releasing sleeve which is axially reciprocable on the holder.

It is another object of this invention to provide a novel form of quick release connection between the tool shank and the tool supporting cartridge wherein locking balls are tightly wedged between a ball actuating sleeve and a smooth cylindrical surface of the tool shank to effectively resist tool pull-out without requiring the formation of a locking groove in the tool shank.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

FIG. 1 is a cross section view through a tool holder embodying the present invention;

FIG. 2 is an end elevation view of the tool supporting cartridge as viewed from the left-hand end thereof;

FIG. 3 is an enlarged fragmentary cross section view illustrating how the locking elements are radially displaced as the tool shank is inserted into the tool supporting cartridge; and FIG. 4 is another enlarged fragmentary cross section view illustrating how the cylindrical tool shank is securely gripped against axial withdrawal.

DISCUSSION OF THE INVENTION

In the illustrated embodiment of the invention the tool holder 1 may be of the floating type as disclosed in the Milton L. Benjamin et al. U.S. application, Ser. No. 611,667, filed Jan. 25, 1967, now U.S. Pat. No. 3,454,283. The shank portion 2 of the holder 1 is adapted to be secured to a machine tool spindle and the tubular floating end portion 3 thereof provides a cylindrical socket 4 to receive a tool supporting cartridge 5.

The tool supporting cartridge 5 has a body 6 which is a slip fit in socket 4 and which has driving engagement with the portion 3 by reason of the radial pin 7 extending into one of the widened portions of the slots 8 at the axially inner end portion of said body. The cartridge body 6 also has a peripheral groove 9 in which are engaged three or more locking balls 10 carried in radial holes formed in the socket portion 3, the balls 10 being held in groove-engaging position as by means of the internally grooved sleeve member 11 which is biased to the right as shown in FIG. 1 by a spring 12. It can be seen that when the sleeve member 11 is moved to the left, the internal groove 14 thereof will be radially opposite the balls 10, whereby the cartridge 5 may be pulled out of the socket portion 3 and another one inserted and locked in place in a matter of a few seconds time.

The cartridge body 6 has a bore 15 of substantially the same diameter as the shank of the tool T, and in the case of a tap, for example, the square end portion 16 non-rotatably fits in the slotted end portion of the body 6 whereby there are positive drive connections between the tool holder portion 3 and the cartridge 5 and between the cartridge 5 and the tool T. If desired, an adjusting screw (not shown) may be positioned in the threaded hole 17 of the tool holder 1 to locate the tool T axially with respect to the tool holder 1.

Adjacent the end of the tool holder portion 3, the cartridge body 6 has reciprocably mounted thereon a wedge sleeve 18 which is urged by springs 19 compressed therebetween and a collar 20 on said body 6 to tightly wedge the balls 21 against the cylindrical shank portion of the tool T. The wedge sleeve 18 has a self-locking tapered bore 23 thus to secure a large force multiplaction to obtain a firm tool gripping force even with relatively light springs 19 urging the sleeve 18 toward the left as viewed in FIG. 1. To quickly release the tool T from the cartridge 5 the frictional gripping of the balls 21 against the tool shank is released simply by moving the sleeve 18 toward the right whereby a larger diameter portion of the bore 23 will be opposite balls 21.

When the tool T has been removed as aforesaid, the springs 19 urge the sleeve 18 toward the left and as a consequence the balls 21 are urged inwardly to a diameter smaller than the bore 15 of the cartridge body 6. Referring to FIG. 3, when the cylindrical portion of the shank of the tool T is pushed toward the left into the cartridge body 6, the balls 21 move radially outward to take up any clearance 24 and when the balls 21 contact the tapered bore 23, the frictional engagement of the balls 21 with the tool shank and with the tapered bore 23 in the sleeve 18 sets up a clockwise rotation of the balls 21 thus to urge the sleeve 18 toward the right against the springs 19 to permit the balls 21 to move outwardly for insertion of the tool T. When the tool T insertion movement is stopped, the springs 19 acting through the tapered bore 23 places the balls 21 in radial compression to firmly secure the tool T against axial withdrawal. It can be seen from FIG. 4 if it be attempted to axially withdraw the tool T, the balls 21 tend to rotate in a counterclockwise direction to urge sleeve 18 toward the left and thus the balls 21 are more tightly wedged between the tool shank and the cam surface 23. Thus it is virtually impossible to axially withdraw the tool T even though the balls 21 are not interlocked in any groove in the shank of the tool T.

As aforesaid, to release the tool T from the cartridge 5 all that it is necessary to do is to move the sleeve 18 toward the right and to pull out the tool T and insert a new or resharpened one. In the case of tool breakage within the cartridge body 6 it may be preferred first to disconnect the cartridge 5 from the tool holder 1 by manipulating the tool holder sleeve 11, whereupon the broken end of the tool T may easily be removed from the cartridge 5 and tool T assembly has been inserted into the tool holder to continue production of the machine with minimum delay.

We, therefore, particularly point out and distinctly claim as our invention:

1. A quick release connection between a tool having a cylindrical shank and a surrounding tubular body, and between said body and a tubular socket portion of a tool holder; the connection between said shank and body comprising a ball extending radially through a wall of said body which is of radial thickness less than the diameter of said ball; and a sleeve axially reciprocable on said body and having an inner wedge taper surface engageable with said ball upon movement of said sleeve in one direction to tightly wedge said ball against the tool shank and thus prevent axial withdrawal of said tool except upon movement of said sleeve in the opposite direction; and the connection between said body and said socket portion comprising an axially spring biased sleeve on said socket portion which holds a ball extending through the wall of said socket portion in engagement with a peripheral groove in said body; said spring biased sleeve having an internal groove which, upon axial movement of said sleeve is positioned radially opposite said ball to permit radial outward movement of said ball out of engagement with said body groove upon application of axial withdrawal force on axial withdrawal force on said body whereby said body and tool may be released as a unit from said socket portion.

2. The quick release connection of claim 1 wherein said socket portion has a radial pin therein which is engaged in an axial slot in said body thus to key said body and socket portion together against relative rotation.

3. The quick release connection of claim 2 wherein said body has a noncircular bore portion adapted to nonrotatably receive the noncircular end portion of the tool.

References Cited

UNITED STATES PATENTS

| | | | |
|---|---|---|---|
| 1,760,860 | 5/1930 | Minnier | 279—30 |
| 2,959,422 | 11/1960 | Manos | 279—30 |
| 3,436,086 | 4/1969 | Glenzer | 279—30 |

ROBERT C. RIORDON, Primary Examiner

D. D. EVENSON, Assistant Examiner